US008112329B2

(12) United States Patent
Canning et al.

(10) Patent No.: US 8,112,329 B2
(45) Date of Patent: Feb. 7, 2012

(54) CONSOLIDATING LEADS RECEIVED FROM POTENTIAL RENTERS FOR BILLING A LISTER

(75) Inventors: Robert N. Canning, Los Angeles, CA (US); Robert Holden, Los Angeles, CA (US); Adrienne Go, San Francisco, CA (US); Curtis Thornhill, Santa Monica, CA (US); William McKnight, Los Angeles, CA (US)

(73) Assignee: eBay Inc., San Jose, CA (US)

( * ) Notice: Subject to any disclaimer, the term of this patent is extended or adjusted under 35 U.S.C. 154(b) by 207 days.

(21) Appl. No.: 12/346,751

(22) Filed: Dec. 30, 2008

(65) Prior Publication Data
US 2010/0169197 A1 Jul. 1, 2010

(51) Int. Cl.
*G07F 19/00* (2006.01)
(52) U.S. Cl. ............... 705/34; 705/1; 705/38; 705/313; 705/500
(58) Field of Classification Search .................... 705/38, 705/1, 34, 313
See application file for complete search history.

(56) References Cited

U.S. PATENT DOCUMENTS

| | | | |
|---|---|---|---|
| 5,032,989 A | | 7/1991 | Tornetta |
| 5,283,731 A | | 2/1994 | Lalonde et al. |
| 5,530,854 A | * | 6/1996 | Emery et al. |
| 5,553,218 A | * | 9/1996 | Li et al. |
| 5,584,025 A | | 12/1996 | Keithley et al. |
| 5,664,115 A | | 9/1997 | Fraser |
| 5,717,989 A | | 2/1998 | Tozzoli et al. |
| 5,736,977 A | | 4/1998 | Hughes |
| 5,754,850 A | | 5/1998 | Janssen |
| 5,794,207 A | | 8/1998 | Walker et al. |
| 5,794,210 A | | 8/1998 | Goldhaber et al. |
| 5,812,670 A | | 9/1998 | Micali |
| 5,818,836 A | | 10/1998 | DuVal |
| 5,884,272 A | | 3/1999 | Walker et al. |
| 5,905,944 A | | 5/1999 | Goldman et al. |
| 6,061,660 A | | 5/2000 | Eggleston et al. |

(Continued)

FOREIGN PATENT DOCUMENTS
WO WO-2007002489 A2 1/2007
(Continued)

OTHER PUBLICATIONS

"U.S. Appl. No. 12/346,754, Response filed Oct. 19, 2011 to Final Office Action mailed Aug. 19, 2011", 12 pgs.

(Continued)

*Primary Examiner* — Vanel Frenel
(74) *Attorney, Agent, or Firm* — Schwegman, Lundberg & Woessner, P.A.

(57) ABSTRACT

In some example embodiments, a system and method are illustrated to bill a lister using consolidated leads received from potential renters. The system and method include receiving from at least one potential renter, at least one lead directed to a property listing associated with a lister. The system and method include consolidating two or more leads received from the same potential renter into a lead group. The system and method further include billing the lister according to the number of distinct leads received from potential renters counting each lead group as a distinct lead. In some example embodiments, the system and method further include setting a specified listing period for the lister and checking whether the specified listing period has expired before counting a received lead.

30 Claims, 5 Drawing Sheets

U.S. PATENT DOCUMENTS

| | | | |
|---|---|---|---|
| 6,131,087 | A | 10/2000 | Luke et al. |
| 6,230,188 | B1 | 5/2001 | Marcus |
| 6,272,467 | B1 | 8/2001 | Durand et al. |
| 6,289,224 | B1 | 9/2001 | Boxall et al. |
| 6,434,532 | B2 | 8/2002 | Goldband et al. |
| 6,594,633 | B1 | 7/2003 | Broerman |
| 6,597,772 | B1* | 7/2003 | Fleming, III |
| 6,665,389 | B1 | 12/2003 | Haste, III |
| 6,684,196 | B1 | 1/2004 | Mini et al. |
| 6,915,308 | B1* | 7/2005 | Evans et al. |
| 6,917,610 | B1* | 7/2005 | Kung et al. |
| 7,047,254 | B2* | 5/2006 | Daggett |
| 7,120,235 | B2 | 10/2006 | Altberg et al. |
| 7,222,105 | B1 | 5/2007 | Romansky |
| 7,246,067 | B2 | 7/2007 | Austin et al. |
| 7,260,675 | B1* | 8/2007 | Bhugra et al. |
| 7,296,028 | B1* | 11/2007 | Ivanova |
| 7,359,498 | B2 | 4/2008 | Faber et al. |
| 7,450,711 | B2 | 11/2008 | Agapi et al. |
| 2001/0026609 | A1 | 10/2001 | Weinstein et al. |
| 2002/0029193 | A1 | 3/2002 | Ranjan et al. |
| 2002/0040319 | A1 | 4/2002 | Brauer |
| 2003/0174821 | A1 | 9/2003 | Bates et al. |
| 2003/0229504 | A1* | 12/2003 | Hollister .................... 705/1 |
| 2005/0125261 | A1 | 6/2005 | Adegan |
| 2005/0144121 | A1 | 6/2005 | Mayo |
| 2005/0149432 | A1* | 7/2005 | Galey .................... 705/38 |
| 2006/0004647 | A1 | 1/2006 | Srinivasamurthy et al. |
| 2006/0010476 | A1 | 1/2006 | Kelly et al. |
| 2006/0059055 | A1 | 3/2006 | Lin |
| 2006/0143238 | A1* | 6/2006 | Tamatsu |
| 2006/0149633 | A1 | 7/2006 | Voisin et al. |
| 2006/0182069 | A1 | 8/2006 | Yu |
| 2006/0192702 | A1* | 8/2006 | Choi et al. |
| 2007/0003038 | A1 | 1/2007 | Siegel et al. |
| 2007/0016921 | A1 | 1/2007 | Levi et al. |
| 2007/0033103 | A1 | 2/2007 | Collins et al. |
| 2007/0067297 | A1 | 3/2007 | Kublickis |
| 2007/0118592 | A1 | 5/2007 | Bachenberg |
| 2008/0097838 | A1 | 4/2008 | Lin et al. |
| 2009/0083197 | A1* | 3/2009 | Gofman et al. .............. 705/36 T |
| 2010/0061546 | A1 | 3/2010 | Weiss et al. |
| 2010/0088167 | A1* | 4/2010 | Alston .................... 705/14.16 |
| 2010/0169198 | A1 | 7/2010 | Canning et al. |
| 2010/0268653 | A1 | 10/2010 | Ingraham et al. |

FOREIGN PATENT DOCUMENTS

| | | |
|---|---|---|
| WO | WO-2007002489 A3 | 1/2007 |
| WO | WO-2007129089 A1 | 11/2007 |

OTHER PUBLICATIONS

"Adserver Solutions: Features of Ad Server Solutions", [Online]. Retrieved from the Internet: <URL: http://www.adserversolutions.com/ad_management/features.html>, (Jul. 2, 2008), 7 pgs.

"U.S. Appl. No. 09/802,719, Examiner Interview Summary mailed Oct. 28, 2007", 1 pg.

"U.S. Appl. No. 09/802,719, Examiner Interview Summary mailed Dec. 8, 2008", 2 pgs.

"U.S. Appl. No. 09/802,719, Final Office Action mailed May 29, 2007", 12 pgs.

"U.S. Appl. No. 09/802,719, Final Office Action mailed Jul. 22, 2009", 12 pgs.

"U.S. Appl. No. 09/802,719, Final Office Action mailed Aug. 8, 2008", 10 pgs.

"U.S. Appl. No. 09/802,719, Non Final Office Action mailed Mar. 23, 2006", 10 pgs.

"U.S. Appl. No. 09/802,719, Non Final Office Action mailed Dec. 1, 2006", 11 pgs.

"U.S. Appl. No. 09/802,719, Non-Final Office Action mailed Feb. 10, 2009", 15 pgs.

"U.S. Appl. No. 09/802,719, Non-Final Office Action mailed Dec. 31, 2007", 19 pgs.

"U.S. Appl. No. 09/802,719, Notice of Allowance mailed Mar. 24, 2010", 6 pgs.

"U.S. Appl. No. 09/802,719, Response filed Jan. 11, 2010 to Restriction Requirement mailed Dec. 10, 2009", 9 pgs.

"U.S. Appl. No. 09/802,710, Response filed Mar. 1, 2007 to Non Final Office Action mailed Dec. 1, 2006", 18 pgs.

"U.S. Appl. No. 09/802,719, Response filed Mar. 31, 2008 to Non-Final Office Action mailed Dec. 31, 2007", 17 pgs.

"U.S. Appl. No. 09/802,719, Response filed May 11, 2009 to Non Final Office Action mailed Feb. 10, 2009", 15 pgs.

"U.S. Appl. No. 09/802,719, Response filed Aug. 21, 2006 to Non Final Office Action mailed Mar. 23, 2006", 18 pgs.

"U.S. Appl. No. 09/802,719, Response filed Sep. 22, 2009 to Final Office Action mailed Jul. 22, 2009", 9 pgs.

"U.S. Appl. No. 09/802,719, Response filed Oct. 29, 2007 to Final Office Action mailed May 29, 2007", 17 pgs.

"U.S. Appl. No. 09/802,719, Response filed Dec. 8, 2008 to Final Office Action mailed Aug. 8, 2008", 14 pgs.

"U.S. Appl. No. 09/802,719, Response filed Dec.8, 2008 to Final Office Action mailed Aug. 8, 2008", 14 pgs.

"U.S. Appl. No. 09/802,719, Restriction Requirement mailed Dec. 10, 2009", 6 pgs.

"U.S. Appl. No. 11/158,916 Non-Final Office Action mailed Sep. 2, 2010", 6 pgs.

"U.S. Appl. No. 11/158,916, Final Office Action mailed Feb. 23, 2011", 7 pgs.

"U.S. Appl. No. 11/158,916, Non-Final Office Action mailed Jan. 22, 2010", 8 pgs.

"U.S. Appl. No. 11/158,916, Non-Final Office Action mailed Dec. 29, 2008", 5 pgs.

"U.S. Appl. No. 11/158,916, Response filed Mar. 30, 2009 to Non Final Office Action mailed Dec. 29, 2008", 11 pgs.

"U.S. Appl. No. 11/158,916, Response Filed May 31, 2011 to Final Office Action mailed Feb. 23, 2011", 12 pgs.

"U.S. Appl. No. 11/158,916, Response filed Dec. 2, 2010 to Non Final Office Action mailed Sep. 2, 2010", 11 pgs.

"U.S. Appl. No. 11/158,916, Response filed May 24, 2010 to Non Final Office Action mailed Jan. 22, 2010", 11 pgs.

"U.S. Appl. No. 12/346,751, Non Final Office Action mailed May 26, 2011", 9 pgs.

"U.S. Appl. No. 12/346,754 , Response filed Jun. 29, 2011 to Non Final Office Action mailed May 26, 2011", 15 pgs.

"U.S. Appl. No. 12/346,754, Final Office Action mailed Aug. 19, 2011", 13 pgs.

"U.S. Appl. No. 12/762,504, Preliminary Amendment mailed May 10, 2010", 3 pgs.

"EHarmony Expert Guidance", Home page plus communication guidelines information, [Online]. Retrieved from the Internet: <URL: http://www.eharmony.com>, (Copyright 2000-2005), 4 p.

"International Application Serial No. PCT/US2006/024625, International Preliminary Report on Patentability mailed Jan. 10, 2008", 5 pgs.

"International Application Serial No. PCT/US2006/024625, International Search Report and Written Opinion mailed Sep. 19, 2007", 10 pgs.

"Match.com Overview and Communication", Home page and communication explanation., [Online], (Copyright 2005), 8 p.

"Ziprealty", Homepage, real estate listing and contact information for real estate agent, [Online]. Retrieved from the Internet: <URL: http://www.ziprealty.com>, (Copyright 1999-2005), 8 p.

\* cited by examiner

CONSOLIDATING LEADS RECEIVED FROM POTENTIAL RENTERS FOR BILLING A LISTER

CROSS REFERENCE TO RELATED APPLICATIONS

The present application is related to United States Patent Application Publication Number 2007/0003038 A1 entitled "SYSTEM TO CAPTURE COMMUNICATION INFORMATION" that was published on Jan. 4, 2007. The present application is also related to U.S. Non-Provisional patent application Ser. No. 12/346,754 entitled "BILLING A LISTER FOR LEADS RECEIVED FROM POTENTIAL RENTERS WITHIN A LEAD CAP" that was filed on the same date (Dec. 30, 2008) as the present application. The contents of both applications are incorporated by reference in their entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2008, eBay Inc. All Rights Reserved.

TECHNICAL FIELD

Example embodiments relate generally to the technical field of algorithms and programming and, in an example, to allowing a lister to list his or her properties in an online listing system and billing the lister for the listing.

BRIEF DESCRIPTION OF THE DRAWINGS

Some embodiments are illustrated by way of example and not limitation in the figures of the accompanying drawings in which.

DETAILED DESCRIPTION

The emergence of an online listing system (e.g., such as eBAY, Amazon, and Rent.com in which goods/services are offered to interested parties) has created new opportunities for a service provider to monetize transactions made between a user (e.g., a renter, a buyer, a prospective buyer, a mortgagor, etc.) and a lister (e.g., a landlord, a seller, a rental manager, a mortgagee, etc.) connected through the online listing system. It is important for the service provider to first identify when a transaction has been made between the user and the lister.

Numerous techniques exist for the service provider (e.g., an operator of the online listing system) to identify distinct users to allow payment of fees for each distinct users. In such a case, the service provider may also identify communications between a distinctive user and the lister when the user and the lister communicate via the Internet (e.g., through email, instant messenger, etc.). For example, the service provider can find the transaction by monitoring and/or reading emails between the user and the lister when they communicate with each other through emails sent to each other through the online listing system. In particular, the patent application publication US 2007/0003038 A1 discloses an apparatus and method to mask users' (e.g., potential renters and listers) identities to each other and track communications (e.g., leads) between them using a proxy contact information (e.g., proxy telephone number or a proxy e-mail address, etc.).

Once the transaction is found, the service provider can charge the user and/or the lister a transaction fee (e.g., such as a fee when a particular property has been rented through a website such as Rent.com). The existing software, prior to our invention, did not allow us to distinguish sufficiently to assure that lister is charged only for a first contact by a potential renter with respect to a rental listing.

In some example embodiments, a system and method are illustrated to bill a lister using consolidated leads received from potential renters. The system and method include receiving from at least one potential renter, at least one lead directed to a property listing associated with a lister. The system and method include consolidating two or more leads received from the same potential renter into a lead group. The system and method further include billing the lister according to the number of distinct leads received from potential renters counting each lead group as a distinct lead. In some example embodiments, the system and method further include setting a specified listing period for the lister and checking whether the specified listing period has expired before counting a received lead. More detailed explanation about the billing of the lister using consolidated leads received from the potential renters is given below using FIGS. 1-5.

Figure 1:
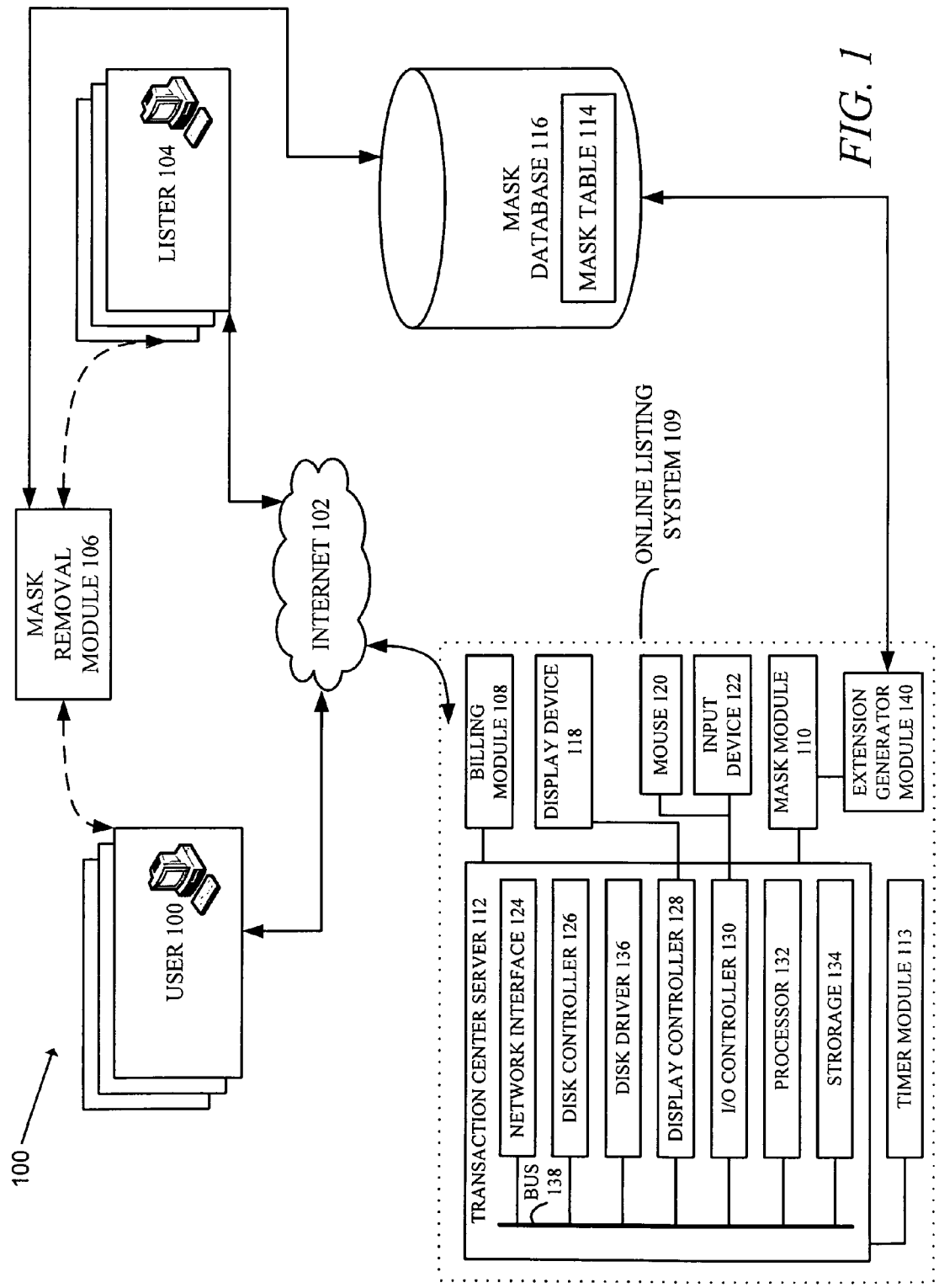
FIG. 1 is a diagram of a computer system for billing a lister based upon the number of leads received from potential renters in accordance with an example embodiment.

FIG. 1 is a diagram of a computer system for billing a lister based upon the number of leads received from potential renters 100 in accordance with an example embodiment. In particular, FIG. 1 shows a system view of an online listing system 109 associated with a mask table 114 and connected to a user (e.g., potential renter) 101 and a lister 104 through a network (e.g., Internet 102) according to an embodiment. The user 101 communicates with the lister 104 through the Internet 102 (e.g., by accessing and searching on an online listing system such as Rent.com), in an example use scenario. In addition, the user 101 may directly communicate with the lister 104 offline through a telephone conversation (e.g., through a mask removal module 106). The mask removal module 106 may reside anywhere in the telephone network (e.g., a circuit switched and/or IP network), and serve as a gateway for offline communications between the user 101 and the lister 104. For example, the mask removal module 106 may reverse the encoding of a phone number that is 'masked' or encoded by a mask module 110 of the online listing system 109. More detailed description about the mask removal module 106 is described in the patent application publication US 2007/0003038 A1 (e.g., FIG. 5).

A transaction center server 112 (e.g., a transaction center server associated with the online listing system 109) may communicate with a billing module 108 and a mask module 110 connected to the transaction center server 112. The transaction center server 112 may also be connected to a display device 118, an input device 122, and a mouse 120, according to an embodiment illustrated in FIG. 1. The transaction center server 112 (e.g., a computer system) includes a network interface 124, a disk controller 126, a disk drive 136, a display controller 128, an I/O controller 130, a processor 132 (e.g., a microprocessor), and a storage 134 (e.g., a hard drive, a dynamic random access memory, and/or a flash memory, etc.) connected to each other through a bus 138 according to an embodiment illustrated in FIG. 1. The I/O controller 130 connects the transaction center server 112 to the input device 122 and the mouse 120 according to the embodiment of FIG. 1. More detailed explanation about a general architecture for a computer system is given below using FIG. 5.

The mask module 110 of the online listing system 109 may generate unique telephone extensions to identify different users (e.g., such as the user 101) of the online listing system using an extension generator module 140. A particular extension generated by the extension generator module 140 may be visible in each listing visited by the user 101 in the online listing system (e.g., each property visited by the user 101 in an online listing system for property rentals). Similarly, the mask module 110 may determine a proxy telephone number (e.g., a substitute phone number to mask an actual telephone number) for each listing posted in the online listing system 109 (e.g., every property posted by a rental manager on the online listing system).

When the user 101 calls in connection with a particular listing, the mask module 110 may determine an identity of the user 101 dialing the proxy telephone number (e.g., by consulting a mask table 114) based on an extension number entered by the user 101 (e.g., an extension number previously generated by an extension generator module 140 connected to the mask module 110). Based on this identity determination, the mask module 110 may update data in the storage 134 associated with the billing module 108 (e.g., to track a particular call and later bill the lister 104 and/or the user 101).

The mask module 110 may consult a mask table 114 of the mask database 116 (e.g., the mask database 116 may be stored in the storage 134 and/or external to the transaction center server 112 in various embodiments). In addition, the mask module 110 may communicate with the mask removal module 106 and permit the mask removal module 106 to convert the proxy telephone number to an actual telephone number of the lister 104 and route a call from the user 101 to the lister 104. The mask removal module 106 may then route the proxy telephone number to the lister 104 from the user 101 after the conversion is made according to an embodiment.

Figure 4:
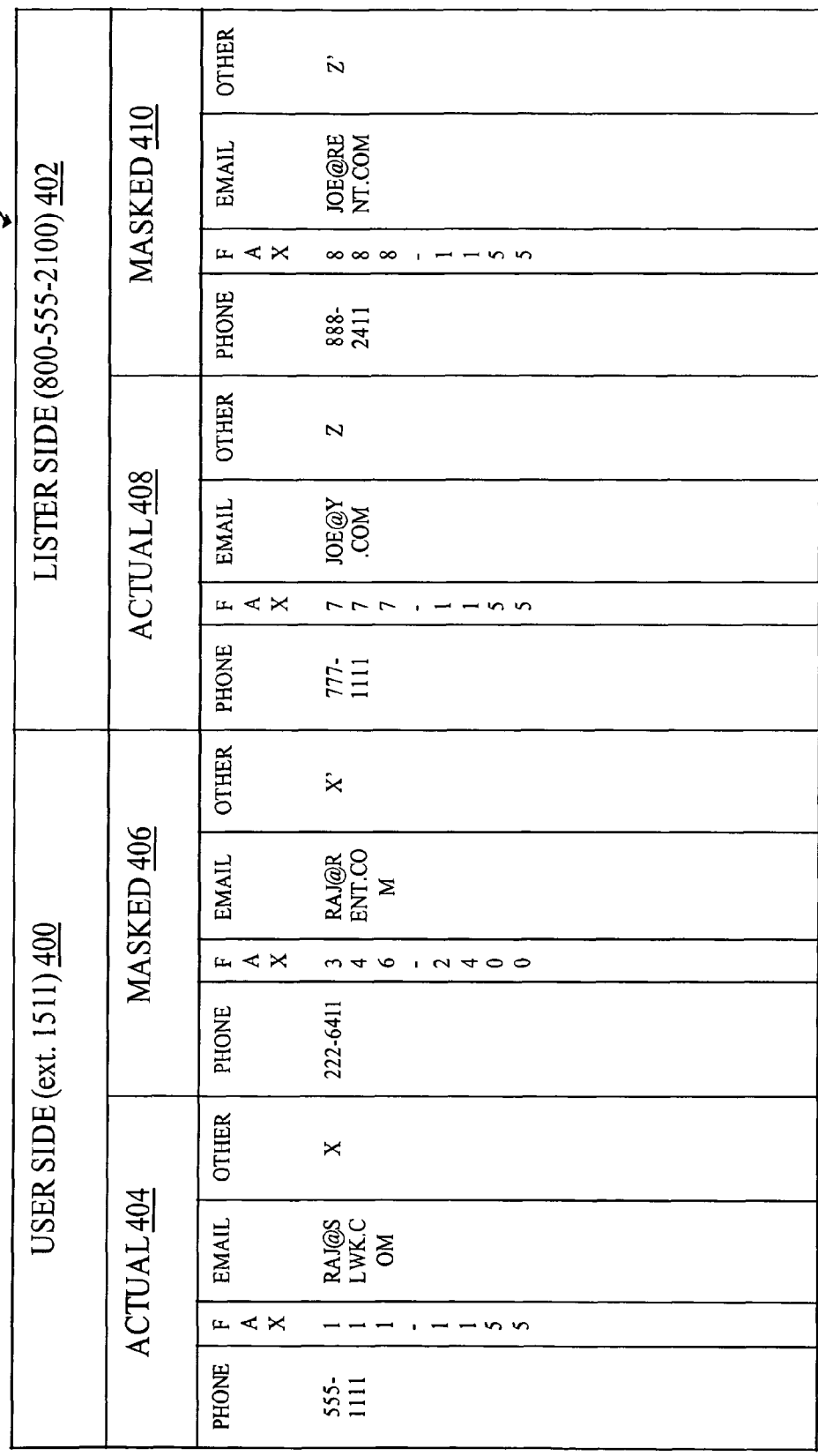
FIG. 4 is a diagram illustrating a mask table for use in the system of FIG. in accordance with an example embodiment.

A detailed view of the mask table 114 is illustrated in FIG. 4 The mask table 114 as illustrated in FIG. 4 includes a user-side data 400 (e.g., the user illustrated having a unique extension 1511) and a lister-side data 402 (e.g., the lister illustrated as having a unique phone number 800-555-2100). The user-side data 400 includes actual user data 404 (e.g., actual phone numbers, email, and other information about a user such as the user 101 as shown in FIG. 1), and masked user data 406 (e.g., masked/proxy phone numbers, email, and other information about a user such as the user 101 as shown in FIG. 1). The masked user data 406 may be generated by the mask module 110 according to one embodiment.

Similarly, in FIG. 4, the lister-side data 402 includes actual lister data 408 (e.g., actual phone numbers, email, and other information about a lister such as the lister 104), and a masked lister data 410 (e.g., masked/proxy phone numbers, email, and other information about a lister such as the lister 104 as shown in FIG. 1). The masked lister data 410 may also be generated by the mask module 110 according to one embodiment. Referring now to FIG. 1, the mask table 114 may be used by the mask module 110 to convert actual contact information associated with the user 101 to masked information and/or vice-versa. In addition, mask table 114 may be used by the mask removal module 106 to convert a proxy telephone number associated with the lister 104 to an actual telephone number of the lister 104 and vice-versa.

For example, the mask removal module 106 (e.g., may be in a circuit switched telephone network and/or in an IP network such as the Internet 102) may reference the mask table 114 of FIG. 4 to convert the proxy telephone number (e.g., as previously generated by the mask module 110) of the lister 104 to an actual telephone number of the lister 104 based on a phone number entered. In addition, the mask removal module 106 may reference the mask table 114 to identify a particular user based on a code (e.g., an extension) entered by the lister 104 wishing to contact the user 101 via telephone according to an embodiment.

Referring back to FIG. 1, the online listing system 109 may identify a lister response (e.g., a rental manager following up on a lead received through the online listing system) to the user 101 (e.g., a user of the online listing system such as a potential renter of an apartment) based on a code (e.g., the code may be an extension entered after dialing a masked user telephone number such as a proxy telephone number) entered by the lister 104 after dialing a proxy telephone number (e.g., a 'masked' telephone number generated by the mask module 110 and substituting for the actual telephone number of the user 101), according to an embodiment. In addition, the billing module 108 of FIG. 1 may capture response history information when routing the proxy telephone number to the user 101.

In some example embodiments, a timer module 113 (e.g., code executed by the processor 132 of the transaction center server 112) may determine how long the lister 104 of the online listing system took to respond to an inquiry from the user 101. The online listing system 109 may also record one or more telephone calls between the user 101 and the lister 104 based on a contract (e.g., a binding agreement) between the user 101 and the lister 104 with a proprietor of the online listing system (e.g., the online listing system 109). The lister may be a rent manager, a landlord, a mortgage broker, or a merchant, according to various embodiments. In addition, the transaction center server 112 may provide to the billing module 108 a periodic log of telephone numbers dialed between users of the online listing system such as the user 101 and, other users of the online listing system 109 and the lister 104.

In some example embodiments, a proxy telephone number generated by the mask module 110 is unique to a particular listing (e.g., a particular item or service offered for sale and/or lease) requested by the user 101, and the extension number (e.g., a telephone extension number) is unique to the user 101. The transaction center server 112 may send to the user 101 additional information about the particular listing based on the duration (e.g., amount of time) of the routed call. Every listing in the online listing system 109 may be associated with an item detail page (e.g., detailed information about a property for lease and/or sale) in the online listing system 109. The user 101 may contact the lister 104 through the proxy telephone number and/or a website lead form on the item detail page.

The billing module 108 may validate a transaction (e.g., a successful lease and/or sale) between the user 101 and the lister 104 based on the call history information and/or the website lead form. The billing module 108 may validate the transaction by automatically scanning (e.g., through an optical character recognition method) the call history information and/or the website lead form to determine whether a binding contract was formed between the parties (e.g., offer, acceptance, consideration). In some example embodiments, the billing module 108 may determine that there is more likely than not a binding contract formed between the parties, and on that basis an automatic signal is transmitted from the billing module 108 to an administrator of the online listing system 109 to follow up with the parties via telephone.

The billing module 108 may also generate a justification to a bill (e.g., a transaction based charge) to at least one of the user and the lister based on any one or more of the call history information and/or the website lead form. In addition, the transaction center server 112 may convert an actual email address of the user 101 entered in the website lead form to a proxy email address, and transmit the proxy email address to the lister 104. Furthermore, the mask module 110 of the transaction center server 112 may receive a call of the user 101 from multiple geographic sites (e.g., from the user's office and/or home location) prior to determining the identity of the user 101 dialing the proxy telephone number based on the extension number entered by the user 101. In addition, the transaction center server 112 may generate the extension based on a logic algorithm having a checksum; and bill the lister (e.g., through the billing module 108) according to the number of leads (e.g., phone calls or emails) received from one or more potential renters. More detailed explanation about the online listing system 109 is given below using FIG. 2-3.

Figure 2:
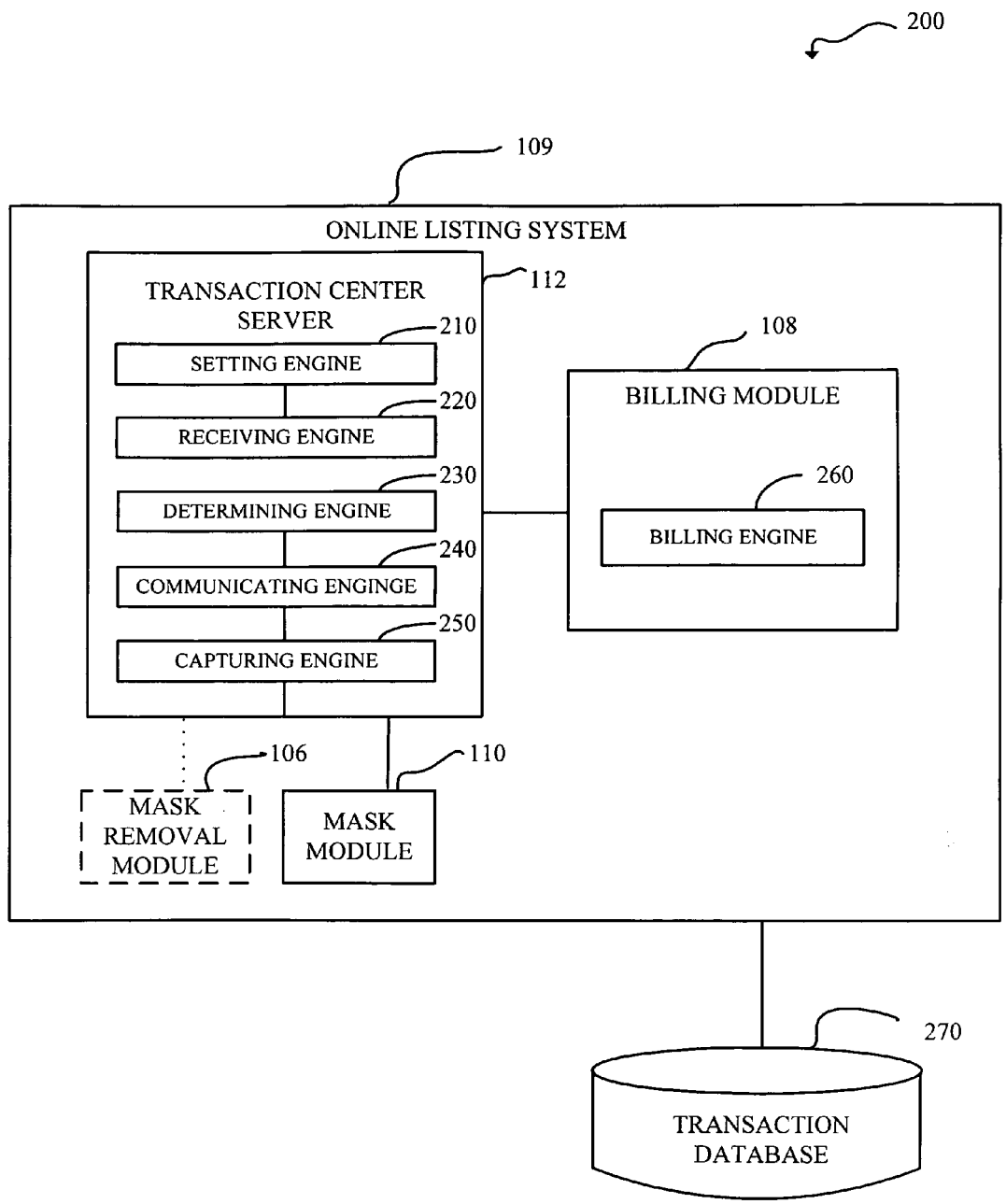
FIG. 2 is a diagram of functional units of an online listing system in accordance with an example embodiment.

FIG. 2 is a diagram of functional units of the online listing system 200 in accordance with an example embodiment. Illustrated in FIG. 2 is the online listing system 109. The online listing system 109 comprises the billing module 108, the transaction center server 112, the mask module 110 and the mask removal module 106. In some example embodiments, the mask removal module 106 may exist outside the online listing system 109 (e.g., in a circuit switched telephone network and/or in an IP network such as the Internet 102). These modules are operatively coupled to one another. The billing module 108 may run a billing engine 230. The transaction center server 112 may run a plurality of functional engines such as a setting engine 210, a receiving engine 220, a notifying engine 240, a capturing engine 250 and a consolidating engine 270, etc. Although the billing module 108 is shown as a separate module from the transaction center server 112, the two modules may be implemented as a single module in some example embodiments.

If one or more listers 104 list their property listings on the online listing system 109, the setting engine 210 may set a specified listing period for a respective lister. In some example embodiments, the listing period may be specified for each listing for the respective lister. The specified listing period may indicate how long the lister wants his property listings to be listed in the online listing system 109 under a current billing mechanism that is explained more in detail below. In other words, when the specified listing period ends, a different billing mechanism may be applied to the listings associated with the lister. An example of the different billing mechanism is described in U.S. Non-Provisional patent application Ser. No. 12/346,754 entitled "BILLING A LISTER FOR LEADS RECEIVED FROM POTENTIAL RENTERS WITHIN A LEAD CAP" that was filed on the same date (Dec. 30, 2008) as the present application. In some example embodiments, the setting engine 210 may further consider the number of listings (e.g., the number of units listed in the online listing system 109) to choose a billing mechanism to be used to the listings for the respective lister.

In some example embodiments, if the listing period ends, the online listing system 109 may simply inactivate the listings associated with the lister.

The setting engine 210 may determine the specified listing period based upon designation (e.g., instruction) sent) from the lister. For example, the lister may designate three months as maximum period for the current billing mechanism to be applied. In some example embodiments, the setting engine 210 may display a plurality of predefined time periods (e.g., a week, a month and a year, etc.) and then receive a selection thereof from the lister via a user interface (not shown in FIG. 2). In some example embodiments, the setting engine 210 may additionally refer to previous transaction history for the lister to determine whether he is eligible for a reduced fee per lead or a bonus listing period at no extra charge. The online listing system 109 may be operatively coupled to a transaction database 260 to store the transaction history between the potential renters and the listers. In some example embodiments, the transaction database 260 may be the mask database 116. In some example embodiments, the transaction database 260 may be coupled to the online listing system 109 remotely, for example, via the Internet 102. Other suitable network, such as a local area network (LAN) or a wide area network (WAN) (not shown in FIG. 2), may be used to couple the transaction database 260 to the online listing system 109.

In some example embodiments, the setting engine 210 may change the specified listing period for the lister upon receipt of a request from the lister. For example, if the lister's budget for listing his properties is reduced for some reasons, then he may want to change the listing period accordingly and vice versa. Also, if the listed property is not available for rent any more (e.g., rented throughout other advertising sources or the property owner or manager's decision not to rent, etc.), then the lister may need to stop listing the property in the online listing system 109. In such cases, the setting engine 210 may receive the lister's request, for example, via the Internet 102 or a telephone network, and change the listing period according to the lister's request. In some example embodiments, the setting engine 210 may receive a valid identifier from the lister to verify his identification. The valid identifier may include the lister's financial information, such as credit card or bank account information.

Once one or more properties are listed, one or more potential renters may access the online listing system 109 via the Internet 102 and search the listings. If a property listing matching their search preferences is found, the potential renters may try to contact corresponding listers using, for example, proxy contact information generated by the mask module 110 as described above in FIG. 1. In some example embodiments, the potential renters may send the corresponding listers leads in a form of a telephone call or email based upon the proxy contact information. The receiving engine 220 may check whether the listing period for the respective lister has not expired. If the listing period has not expired, then the receiving engine 220 may receive a number of leads sent by the potential renters and directed to a property listing associated with the corresponding listers. In some embodiments, the listing period may be checked by the billing engine 230 before counting leads received from the potential renters. The billing engine 230 will be explained in more detail below.

The receiving engine 220 may also notify the lister of a receipt of the leads. In notifying the lister, the receiving engine 220 may indicate remaining listing period to the lister. Also, if the remaining listing period reaches one of specified threshold time point, the receiving engine 220 may send a message requesting an extension of the listing period to the lister. The receiving engine 220 may further represent the message in a different representation (e.g., different coloring or using different text size, etc.) according to a corresponding predefined threshold time point. For example, when the listing period for the lister is 90 days, if 85 days have passed so far, then the extension request message may be represented in a red color and/or large font size (e.g., size 14) while represented in a yellow color and/or normal font size (e.g., size 10) if 80 days have passed. In some example embodiments, the online listing transaction system 109 may run a notifying engine 240 separate from the receiving engine 220 for such notification purposes.

When potential renters send leads (e.g., contacts in a form of a phone call or email) to listers and the listers respond to the leads, corresponding transaction history may be captured by the transaction center server 112 using, for example, the mask module 110 and the mask removal module 106. More detailed explanation about capturing communication information between the potential renters and the listers are described in the patent application publication US 2007/0003038 A1. In some example embodiments, the transaction center server 112 may have a separate capturing engine 250 operatively coupled with the receiving engine 220 and the notifying engine 240, to capture and manage the communication information between the potential renters and the listers.

If the transaction history (e.g., sending and receiving leads) between the potential renters and the listers are captured by the transaction center server 112 (e.g., by the capturing engine 250), the consolidating engine 270 may consolidate two or more of the leads received from the same potential renter into a lead group. The consolidating engine 270 may further associate a lead group identifier with the lead group and then present the lead group identifier to the lister. In some example embodiments, once consolidated, the consolidated group information may also be managed by the capturing engine 250 along with non-consolidated transaction history between the potential renters and the listers. In such a case, the billing module 108 may access the capturing engine 250 and/or the consolidating engine 270 to get the transaction information as necessary to bill the listers later (e.g., the total number of leads sent to each lister and the number of leads for the lister after consolidating, etc.).

When transactions between the potential renters and the listers (e.g., sending and responding to leads, etc.) are done, the billing engine 230 may bill each lister according to the number of leads received from the potential renters. In some example embodiments, the billing engine 230 may bill the respective lister for each listing associated with him. In billing the lister, the billing engine 230 may count the lead group as a single lead. In some example embodiments, the billing engine 230 may conduct the billing process on a basis of a specified periodic time. For example, the listers may be billed every day, week, month or year, etc. Also, the billing engine 230 may change the specified periodic time (e.g., week) to another specified periodic time (e.g., month) and vice versa as necessary (e.g., upon receipt of a corresponding request by the lister). In some example embodiments, the online listing system 109 may further set a specified listing period for a given property listing. In such a case, the billing engine 230 may check whether the listing period has expired before counting leads received from the potential renters.

When billing a lister, the billing engine 230 may also inactivate property listings associated with the lister. In some example embodiments, the billing engine may inactivate the property listings associated with the lister upon receipt of an inactivation request from the lister. For example, the lister may want to stop listing his properties on the online listing system 109 for some reasons. In such a case, the lister may send such a request to the online listing system 109 by simply pressing an "Inactivation" menu via the user interface (not shown in FIG. 2). In some example embodiments, the billing engine 230 may inactivate the property listings associated with the lister if the specified listing period has passed. In some example embodiments, if one or more property listings are inactivated, the billing engine 230 may further reactivate the inactivated property listings upon receipt of a corresponding indication from the lister. In such a case, the billing engine 230 may require the lister to deposit a predefined budget before allowing the reactivation request.

In some example embodiments, a lead cap may be further set for the respective lister by the transaction center server 112 (e.g., by the receiving engine 220). In such a case, the billing engine 230 may inactivate the property listing associated with the lister if the number of leads received from the potential renters reaches the lead cap. More detailed explanation about using the lead cap is described in U.S. Non-Provisional patent application Ser. No. 12/346,754 entitled "BILLING A LISTER FOR LEADS RECEIVED FROM POTENTIAL RENTERS WITHIN A LEAD CAP" that was filed on the same date (Dec. 30, 2008) as the present application. In some example embodiments, the billing engine 230 may charge the lister only for the first lead received from each potential renter.

In some example embodiments, the transaction center server 112 may not specify the listing period or the lead cap for the respective lister at all. The transaction center server 112 may then comprise the receiving engine 220, the capturing engine 250 and the billing engine 230. The receiving engine 220 may not check whether the listing period (and/or the lead cap) has been reached before receiving the lead sent from the potential renters and directed to the respective listers. In such a case, the online listing system 109 may list the listings and bill the respective lister under a given billing mechanism until it receives, for example, an inactivation request from the lister. It is noted that each of the engines described above in FIG. 2 may be implemented by hardware (e.g., circuit), firmware, software or any combinations thereof. It is also noted that although each of the engines is described above as a separate module, the entire engines or some of the engines in FIG. 2 may be implemented as a single entity (e.g., module or circuit) and still maintain the same functionality.

Figure 3:
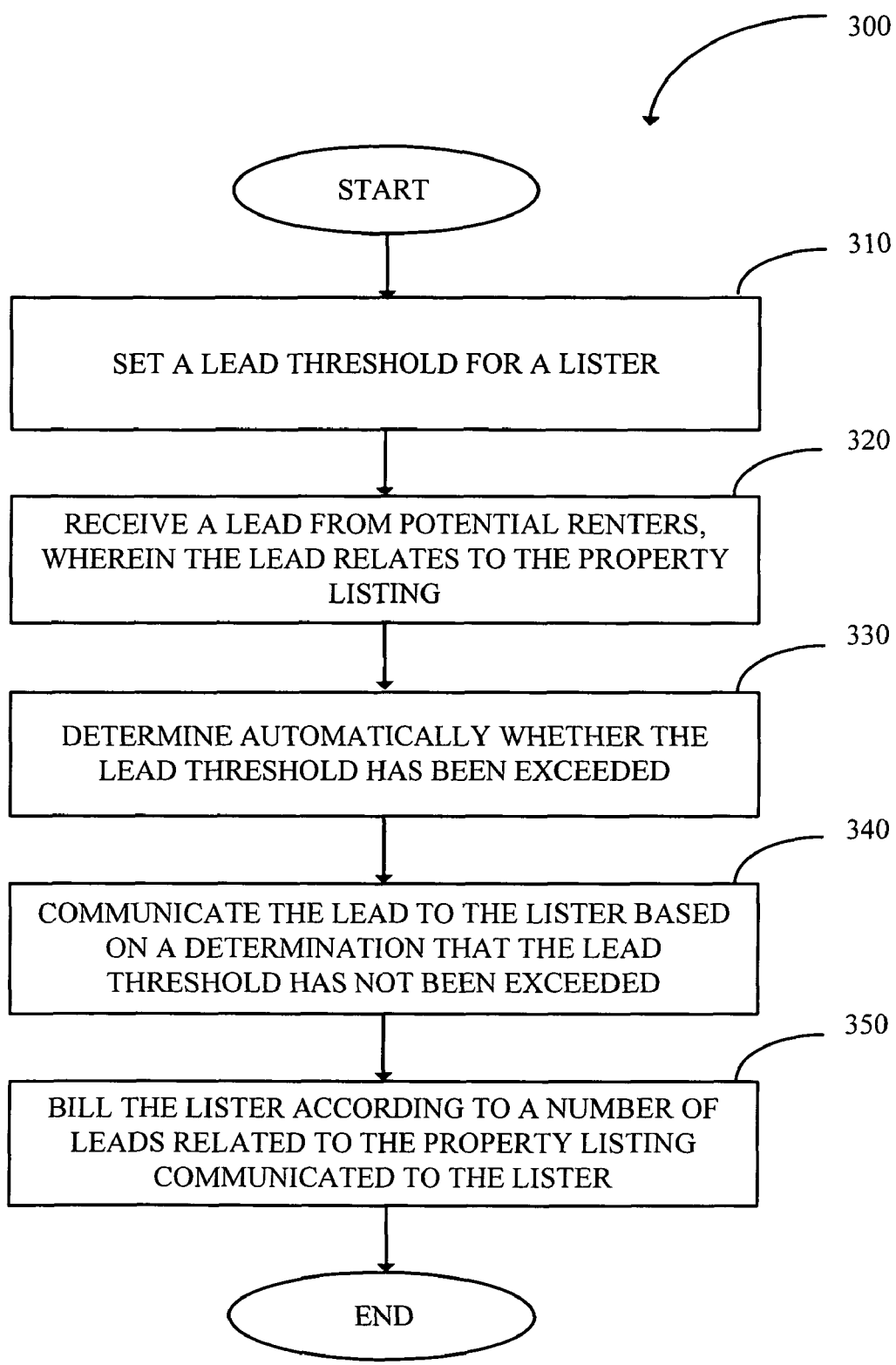
FIG. 3 is a flow chart illustrating a method used to bill a lister according to the number of leads received from potential renters in accordance with an example embodiment.

FIG. 3 is a flow chart illustrating a method used to bill a lister according to the number of leads received from potential renters 300 in accordance with an example embodiment. At operation 310, a listing period may be set for a respective lister. In some example embodiments, the listing period may be specified for each listing for the respective lister. In some example embodiments, the listing period may be based upon designation (e.g., instruction) of an initial maximum period of listing received from the lister. In some example embodiments, the listing period may be changed upon receipt of a request from the lister. In some example embodiments, in setting the listing period for the respective lister, a valid user identifier may be received from the lister. The valid user identifier may include financial information (e.g., credit card information or bank account information, etc.) of the lister. In some example embodiments, in setting the listing period, the lister's previous transaction history may be used to determine whether the lister is eligible for a reduced fee per lead or free bonus period for listing.

At operation 320, a number of leads may be received from one or more potential renters if the listing period has not expired. Each lead may be directed to a property listing associated with the lister. In some example embodiments, the receipt of the leads from the potential renters may be notified to the lister whose property listings the leads are directed to. In some example embodiments, the number of remaining listing period may be indicated to the lister in a notification to the lister. In some example embodiments, a message requesting an extension of the listing period may be sent to the lister along with the indication if the remaining listing period passes one of specified threshold time points (e.g., 80 or 90 days out of 100-day listing period). In some example embodiments, the message requesting an extension of the listing period may be represented in a different representation (e.g., different coloring or font size) according to a corresponding predefined threshold time point. For example, when the listing period for the lister is 100 days, if 90 days have passed so far, then the extension request message may be represented in a red color and/or large font size (e.g., size 14) while represented in a yellow color and/or normal font size (e.g., size 10) if 80 days have passed.

At operation 330, two or more of the leads received from the same potential renter may be consolidated into a lead group. The lead group may be further associated with a lead group identifier and then presented to the lister, for example, via the user interface of the lister. In some example embodiments, once consolidated, the consolidated group information may also be managed (e.g., by the capturing engine 250 and/or the consolidating engine 270) along with non-consolidated transaction history between the potential renters and the listers. In such a case, the transaction information may be accessed (e.g., by the billing module 108 at the capturing engine 250 and/or the consolidating engine 270) and used as necessary to bill the listers later. For example, the total number of leads sent to each lister and/or the number of lead groups may be referred to.

At operation 340, the respective lister may be billed according to the number of leads received from the potential renters. In billing the lister, the consolidated lead group may be counted as a single lead. In some example embodiments, the billing may be done for each listing of the respective lister. In some example embodiments, the billing occurs on a basis of a specified periodic time (e.g., every week, month or year, etc.). The specified periodic time may be changed from one (e.g., week) to another (e.g., month), for example, upon receipt of a corresponding request from the lister. In some example embodiments, in billing the lister, the property listing associated with the lister may be inactivated upon receipt of an inactivation request from the lister. In some example embodiments, the property listing associated with the lister may be inactivated if the listing period has passed. In some example embodiments, if one or more property listings for the lister are inactivated, the inactivated property listing may be reactivated, for example, upon receipt of an indication from the lister that an extended listing period is designated. In such a case, the lister may be requested to deposit a predefined budget before allowed to reactivate the inactivated listings.

In some embodiments, the listing period and/or the lead cap for the respective lister may not be specified. Then, it may not be checked whether the listing period (and/or the lead cap) has passed before the leads sent from the potential renters and directed to the respective listers are received. In such a case, the listings may be listed until, for example, an inactivation request is received from the lister. The lister may then be billed under a given billing mechanism until the inactivation of the listing.

In some example embodiments, a lead cap may be further set for the respective lister by the transaction center server 112 (e.g., by the receiving engine 220). In such a case, the property listing associated with the lister may be inactivated if the number of leads received from the potential renters reaches the lead cap. More detailed explanation about using the lead cap is described in U.S. Non-Provisional patent application Ser. No. 12/346,754 entitled "BILLING A LISTER FOR LEADS RECEIVED FROM POTENTIAL RENTERS WITHIN A LEAD CAP" that was filed on the same date (Dec. 30, 2008) as the present application.

Example Database

Some example embodiments may include the various databases (e.g., the mask database 116 and the transaction database 260) being relational databases or in some example cases On Line Analytic Processing (OLAP)-based databases. In the case of relational databases, various tables (e.g., mask table 114) of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using Multidimensional Expressions (MDX) may be implemented. In the case of a database using tables and SQL, a database application such as, for example, MYSQL™, SQLSERVER™, Oracle 8I™, 10G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), JavaBeans (JB), Enterprise JavaBeans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, and additionally Asynchronous Transfer Mode (ATM), Systems Network Architecture (SNA), or some other suitable protocol. These networks may be organized within a variety of topologies (e.g., a star topology) or structures.

A Computer System

Figure 5:
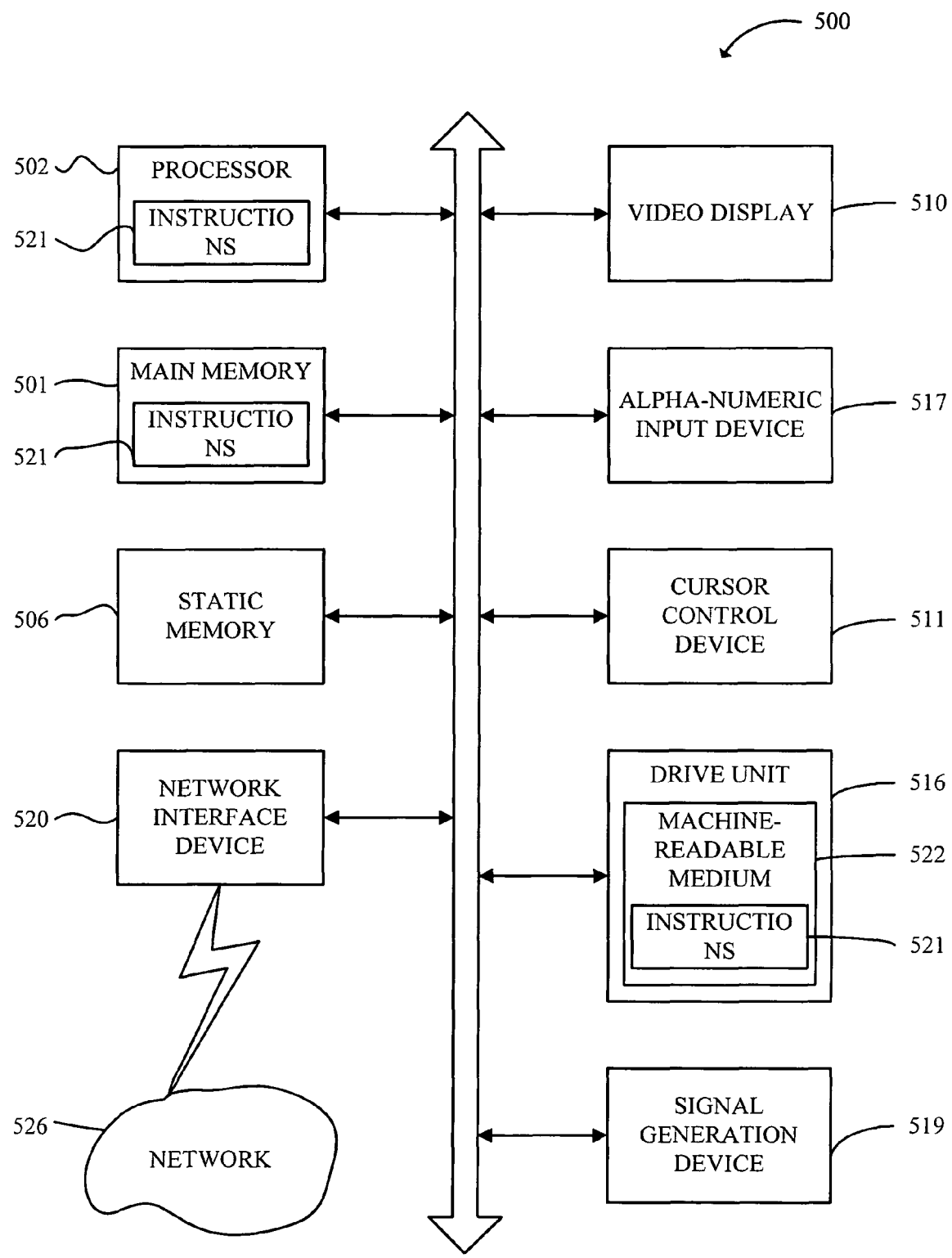
FIG. 5 is a diagram showing an example computer system that executes a set of instructions to perform any one or more of the methodologies discussed herein.

FIG. 5 is a diagram showing an example computer system 700 that executes a set of instructions to perform any one or more of the methodologies discussed herein. In some example embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The computer system 500 includes a processor 502 (e.g., a Central Processing Unit (CPU), a Graphics Processing Unit (GPU) or both), a main memory 501, and a static memory 506, which communicate with each other via a bus 508. The computer system 500 may further include a video display 510 (e.g., a Liquid Crystal Display (LCD) or a Cathode Ray Tube (CRT)). The computer system 500 also includes an alpha-numeric input device 517 (e.g., a keyboard), a User Interface (UI) cursor controller device 511 (e.g., a mouse), a drive unit 516, a signal generation device 519 (e.g., a speaker) and a network interface device (e.g., a transmitter) 520.

The drive unit 516 includes a machine-readable medium 522 on which is stored one or more sets of instructions and data structures (e.g., software) embodying or used by any one or more of the methodologies or functions illustrated herein. The software may also reside, completely or at least partially, within the main memory 501 and/or within the processor 502 during execution thereof by the computer system 500, the main memory 501 and the processor 502 also constituting machine-readable medium 522.

The instructions 521 may further be transmitted or received over a network 526 via the network interface device 520 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

Some example embodiments include a system and method for billing a lister using consolidated leads received from potential renters. The system and method include receiving from at least one potential renter, at least one lead directed to a property listing associated with a lister. The system and method include consolidating two or more leads received from the same potential renter into a lead group. The system and method further include billing the lister according to the number of distinct leads received from potential renters counting each lead group as a distinct lead. In some example embodiments, the system and method further include setting a specified listing period for the lister and checking whether the specified listing period has expired before counting a received lead.

Additional Notes

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be tangibly stored on one or more volatile or non-volatile computer-readable media such as during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above "DETAILED DESCRIPTION" includes references to the accompanying drawings, which form a part of the "DETAILED DESCRIPTION." The drawings show, by way of illustration, specific embodiments of the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A computer-implemented method, comprising:
   receiving at least one lead from a user device corresponding to at least one potential renter via a network, the at least one lead directed to a property listing associated with a lister;
   consolidating two or more leads received from a same potential renter into a lead group; and
   billing the lister according to a number of distinct leads received from potential renters, the billing including counting each lead group as a distinct lead.

2. The method of claim 1, further comprising:
   setting a specified listing period for the lister; and
   checking whether the specified listing period has expired before counting a received lead.

3. The method of claim 2, wherein the setting further comprises determining the specified listing period for the lister based upon an instruction received from the lister.

4. The method of claim 2, wherein the setting further comprises changing the specified listing period for the property listing upon receipt of a request from the lister.

5. The method of claim 2, wherein the setting further comprises receiving a valid identifier from the lister.

6. The method of claim 2, wherein the billing further comprises inactivating the property listing associated with the lister if the specified listing period has expired.

7. The method of claim 6, wherein the inactivating further comprises reactivating the inactivated property listing upon receipt of a corresponding indication from the lister.

8. The method of claim 1, wherein the receiving further comprises notifying the lister of receipt of the at least one lead.

9. The method of claim 8, wherein the notifying further comprises indicating a listing period remaining to the property listing.

10. The method of claim 1, wherein the consolidating further comprises presenting a lead group identifier corresponding to the lead group to the lister.

11. The method of claim 1, wherein the billing occurs on a basis of a specified periodic time.

12. The method of claim 1, wherein the billing further comprises inactivating the property listing associated with the lister upon receipt of an inactivation request from the lister.

13. The method of claim 1, further comprising:
setting a lead cap for the lister; and
inactivating the property listing associated with the lister if the number of leads received from the potential renters reaches the lead cap.

14. A computer system, comprising:
one or more processors to operate at least one of a receiving engine, a consolidating engine and a billing engine, the receiving engine to receive at least one lead from a user device corresponding to at least one potential renter, the at least one lead directed to a property listing associated with a lister, the consolidating engine to consolidate two or more leads received from a same potential renter into a lead group and the billing engine to bill the lister according to a number of distinct leads received from the potential renters, the billing including counting each lead group as a distinct lead.

15. The system of claim 14, wherein the receiving engine is further configured to set a specified listing period for the lister and to check whether the specified listing period expired before counting a received lead.

16. The system of claim 15, wherein the receiving engine is further configured to determine the specified listing period for the lister based upon an instruction received from the lister.

17. The system of claim 15, wherein the receiving engine is further configured to change the specified listing period for the lister upon receipt of a request from the lister.

18. The system of claim 15, wherein the billing engine is further configured to inactivate the property listing associated with the lister if the specified listing period has expired.

19. The system of claim 18, wherein the billing engine is further configured to reactivate the inactivated property listing upon receipt of a corresponding indication from the lister.

20. The system of claim 14, wherein the receiving engine is further configured to receive a valid identifier from the lister.

21. The system of claim 14, wherein the receiving engine is further configured to notify the lister of receipt of the lead.

22. The system of claim 21, wherein the receiving engine is further configured to indicate a listing period remaining to the property listing.

23. The system of claim 14, wherein the consolidating engine is further configured to present a lead group identifier corresponding to the lead group to the lister.

24. The system of claim 14, wherein the billing engine is further configured to bill the lister on a basis of a specified periodic time.

25. The system of claim 14, wherein the billing engine is further configured to inactivate the property listing associated with the lister upon receipt of an inactivation request from the lister.

26. The system of claim 14, wherein the receiving engine is further configured to set a lead cap for the lister and wherein the billing engine is further configured to inactivate the property listing associated with the lister if the number of leads received from the potential renters reaches the lead cap.

27. The system of claim 14, wherein the billing engine is configured to charge the lister only once for a plurality of leads received from a same potential renter with respect to a same property listing.

28. The system of claim 14, wherein the billing engine is configured to charge the lister only for a first lead of a plurality of leads received from a same potential renter with respect to a same property listing.

29. An apparatus, comprising:
one or more processors to operate a consolidating engine and a billing engine, the consolidating engine to consolidate two or more leads received from a same potential renter into a lead group, each of the two or more leads directed to a property listing associated with a lister and the billing engine to bill the lister according to a number of distinct leads received from potential renters, the billing including counting each lead group as a distinct lead.

30. A non-transitory computer-readable medium storing instructions that, when executed by at least one processor, cause the at least one processor to perform operations comprising:
receiving at least one lead from a user device corresponding to at least one potential renter via a network, the at least one lead directed to a property listing associated with a lister;
consolidating two or more leads received from a same potential renter into a lead group; and
billing the lister according to a number of distinct leads received from potential renters, the billing including counting each lead group as a distinct lead.

* * * * *

UNITED STATES PATENT AND TRADEMARK OFFICE
CERTIFICATE OF CORRECTION

PATENT NO. : 8,112,329 B2
APPLICATION NO. : 12/346751
DATED : February 7, 2012
INVENTOR(S) : Robert N. Canning et al.

It is certified that error appears in the above-identified patent and that said Letters Patent is hereby corrected as shown below:

On Title Page 2, Item (56) under "Other Publications", line 9, delete "09/802,710," and insert -- 09/802,719, --, therefor.

In the Drawings:

On Sheet 1 of 5, in Reference Numeral 134, Figure 1, line 1, delete "STRORAGE" and insert -- STORAGE --, therefor.

On Sheet 2 of 5, in Reference Numeral 240, Figure 2, line 1, delete "ENGINGE" and insert -- ENGINE --, therefor.

Signed and Sealed this
Ninth Day of April, 2013

Teresa Stanek Rea
*Acting Director of the United States Patent and Trademark Office*